Figure 1:
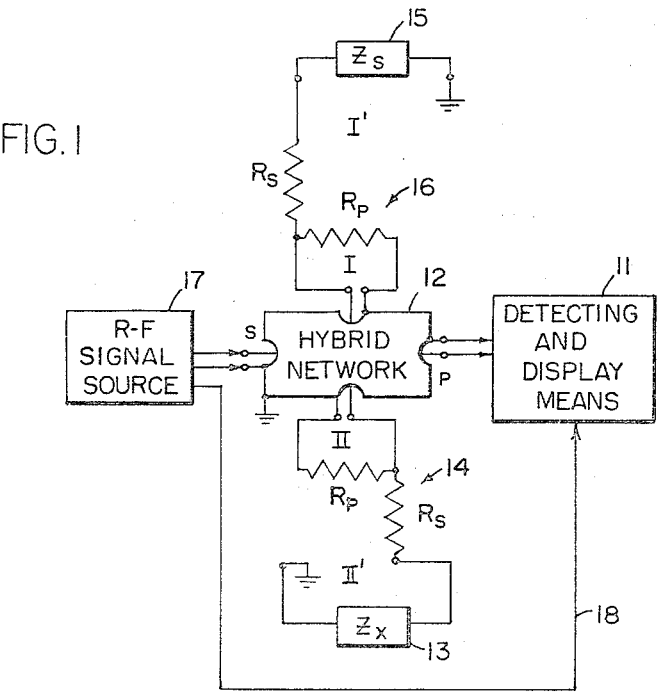

March 14, 1967 A. ALFORD 3,309,608

HIGH FREQUENCY TECHNIQUES FOR MEASURING REFLECTED ENERGY

Filed Oct. 22, 1963

INVENTOR.
ANDREW ALFORD
BY
Ezekiel Wolf, Wolf & Greenfield
ATTORNEYS

United States Patent Office 3,309,608
Patented Mar. 14, 1967

3,309,608
HIGH FREQUENCY TECHNIQUES FOR MEASURING REFLECTED ENERGY
Andrew Alford, Winchester, Mass.
(299 Atlantic Ave., Boston, Mass. 02110)
Filed Oct. 22, 1963, Ser. No. 317,906
7 Claims. (Cl. 324—58)

The present invention relates in general to high frequency techniques and more particularly concerns novel methods and means for improving a network having hybrid properties to provide an accurate indication of reflection coefficients over wide magnitude and frequency ranges. The present invention is especially useful in connection with automatic impedance plotters generally of the type disclosed in Watts U.S. Patent No. 3,061,780 and Watts-Alford U.S. Patent No. 2,983,866 typically embodied in commercial form in the Alford Manufacturing Company type 14 and 15 impedance plotters described in Alford Manufacturing Company instruments and components catalogs.

In a typical commercial version of the Alford automatic impedance and transfer characteristic plotter, a network having hybrid properties, such as the network described in Alford U.S. Patent No. 2,950,449, is arranged with a standard reference impedance connected to one side branch and an unknown impedance connected to the opposite side branch. The energy received at one of series and parallel branches in response to energy applied to the other of the series and side branches is directly proportional to the complex reflection coefficient of the unknown impedance with respect to the standard reference impedance when the impedance of the source and of the receiver match the respective branches to which they are connected. In a typical arrangement this standard characteristic impedance of the network having hybrid properties is 50 ohms.

In one form of automatic impedance and transfer characteristic plotter means are provided for resolving the received signal into quadrature components that are applied to respective orthogonal pairs of deflection plates of a cathode ray tube to deflect the spot to a position with respect to the center of the cathode ray tube representative of the vector reflection coefficient. In another form of automatic SWR and transfer characteristic meter, the magnitude only of the reflection coefficient is effectively preserved.

These instruments have met with wide acceptance in industrial and governmental laboratories throughout the world in connection with numerous applications. Despite the generally high performance and flexibility of these instruments in facilitating many measurements, these instruments have some shortcomings when it is desired to make certain measurements.

One shortcoming has been observed in connection with measuring unknown impedances having a magnitude which differs considerably from that of the standard impedance; that is, when the reflection coefficient is relatively high (near unity). The problem is best described by setting forth the phenomena observed when making a typical test of an automatic impedance plotting instrument. A typical test involves terminating the unknown impedance side branch with at least several wavelengths of low-loss cable of known characteristic impedance. As the frequency of the source varies, the path traced out by the spot on the cathode ray tube should be a circle corresponding to the perimeter of a Smith chart centered about the center of the cathode ray tube, this center corresponding to the point 1, 0 on a Smith chart presentation. However, the pattern observed on a Smith chart presentation with infinity as full scale is a distorted circle with center displaced from the point 1, 0. These observations indicate that errors may be expected upon measuring unknown impedances which introduce a reflection coefficient near unity, an error that may be especially significant in systems measuring only the magnitude of reflection coefficient.

It is believed that a probable cause of such errors resides in slight differences in the effective reactances at the respective side branches. While these differences seem to have little effect on the accuracy of measurements when standard and unknown impedances are of the same order of magnitude, they seem to become significant when the unknown impedance magnitude is considerably less or considerably greater than that of the standard impedance.

Accordingly, it is an important object of this invention to modify a network having hybrid properties so that it may be used in impedance measuring involving comparing a standard with an unknown over an exceptionally wide range of unknown impedances.

It is still a further object of the invention to achieve the preceding object with means permitting the impedance of the unknown to be compared with an impedance that is different from that of the standard characteristic impedance of the network having hybrid properties.

It is still another object of the invention to achieve the preceding object with relatively little additional apparatus that is easy to install and costs very little.

It is still a further object of the invention to achieve the preceding objects over a wide frequency range.

According to the invention, a network having hybrid properties has at least one side branch terminated by resistive means comprising an attenuator which couples a pair of side terminals to that side branch so that when the side terminals are terminated in a prescribed characteristic impedance, the latter impedance coacts with the attenuating means to terminate the side branch in the standard characteristic impedance of the network having hybrid properties.

Figure 2:
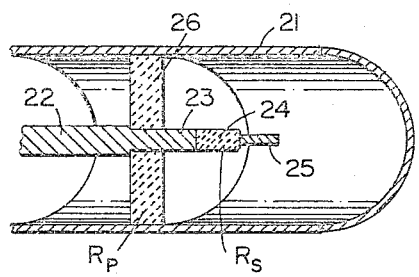

Numerous other features, objects and advantages of the invention will become apparent from the following specification when read in connection with the accompanying drawing in which:

FIG. 1 shows a combined block-schematic diagram illustrating the logical arrangement of a complete measuring system embodying the principles of the invention; and FIG. 2 is a sectional view of a suitable coaxial attenuator for use in the invention.

With reference now to the drawing and more particularly FIG. 1, a detecting and display means 11 energized by the parallel branch P of hybrid network 12 provides an indication of the reflection coefficient of the unknown impedance 13 coupled by the attenuator 14 to the side branch II of hybrid network 12 with respect to the standard impedance 15 at the side terminal pair I' coupled by the L attenuator 16 to the side branch I of hybrid network 12 at the frequency of the signal applied to the series branch of RF signal source 17. Detecting and display means 11 may also receive the signal on line 18 from RF signal source 17 for use in connection with displaying a vector representation of the reflection coefficient.

For a full description of automatic SWR, impedance and transfer characteristic displaying systems, reference is made to Instruments and Components Catalog SK of the Alford Manufacturing Company, pp. 19–37. The networks exhibiting hybrid characteristics may be any of those described on pages 40–45 of that catalog or shown in U.S. Patent Nos. 2,769,146, 2,950,449 or 2,976,497, for example.

It was explained above that small differences in reactances presented at the side branches were believed to be at least in part responsible for some of the errors apparently observed. An important aspect of this invention resides in terminating each side branch in a resistance designated $R_p$ that is low compared to the shunt reactance across this side branch, a reactance that primarily exhibits the properties of a quarter wavelength transmission line short circuited at its far end. A series resistance $R_s$ then couples the ungrounded terminal of each side branch I and II to the ungrounded terminal of each side terminal pair I′ and II′, respectively. Thus the resistances $R_s$ and $R_p$ form an L attenuator.

Now if side terminal pair I′ is terminated in the standard impedance and the impedance presented at side terminal pair II′ varied over the full range from short circuit to open circuit, the change seen at side branch II is only from the parallel combination of $R_p$ and $R_s$ at short circuit to $R_p$ at open circuit. The observed result is that the display unit displays the circle on the infinite scale Smith chart mentioned above when a low-loss cable of several wavelengths is connected to side terminal pair II′.

The advantages of this invention may be attained by using only the attenuator 14 and terminating side branch I in the standard characteristic impedance of the network. Such an arrangement will result in an output signal provided by parallel branch P that is characteristic of the reflection coefficient of the unknown impedance 13 with respect to the impedance seen at the side terminal pair II′. Thus, if the standard characteristic impedance of side branch II when the other branches are properly terminated is 50 ohms, $R_p$ is 86.6 ohms and $R_s$ is 43.3 ohms so that the input impedance seen at terminals II′ is substantially 75 ohms and the reflection coefficient of the impedance $Z_x 13$ is referenced to 75 ohms. If it is desired to also include attenuator 16, then $Z_s 15$ is also 75 ohms and the resistances $R_p$ and $R_s$ of attenuator 16 have the same value as corresponding resistances of attenuator 14. In general, the resistances $R_p$ and $R_s$ are determined from solving a pair of equations in which $Z_o$ is the standard characteristic impedance of the hybrid network branches and $Z_s$ is the impedance with which the reflection coefficient with the unknown impedance $Z_x$ is to be referenced. These equations are:

(1) $$R_s + R_p Z_o / R_p + Z_o = Z_s$$

(2) $$\frac{R_p(R_s + Z_s)}{R_p + R_s + Z_s} = Z_o$$

For practical reasons it has been found advantageous to use both attenuators 14 and 16 and make these attenuators as identical as practical. This is believed to help maintain a high degree of balance over a wide frequency range.

Referring to FIG. 2, there is shown a longitudinal sectional view of a coaxial attenuator suitable for use between a coaxial side branch and a coaxial side terminal pair. Outer conductor 21 is coaxial about a four section inner conductor. Section 22 is of relatively wide diameter to establish a line impedance corresponding to that of side branch II. Section 23 is of slightly smaller diameter to maintain substantially the same impedance with the annular disc resistor $26R_p$ surrounding it. Section 24 is tubular resistor $R_s$ of substantially the same diameter as section 23. Section 25 is the smallest in diameter of the three sections to establish a line impedance corresponding substantially to that of side terminal pair II′.

It is evident that those skilled in the art may now make numerous modifications of and departures from the specific embodiments described herein without departing from the inventive concepts. Consequently, the invention is to be construed as limited solely by the spirit and scope of the appended claims.

What is claimed is:

1. High frequency reflector energy measuring apparatus comprising,
a network exhibiting hybrid properties over a prescribed frequency range and having a series branch, a parallel branch and a pair of side branches with each of said branches characterized by a common characteristic impedance,
said network including an effective reactance across at least one of said side branches that is much larger than said common characteristic impedance within said prescribed frequency range and having the property that when said side branches are terminated in equal impedances and energy applied to one of said series and parallel branches all said energy divides equally between said impedances terminating said side branches,
a first pair of side terminals,
attenuating means coupling said first pair of side terminals to said at least one of said side branches including resistive means much less than said effective reactance within said prescribed frequency range for terminating said at least one side branch so that a first prescribed nominal impedance terminating said pair of side terminals coacts with said attenuating means to terminate said at least one side branch in said common characteristic impedance,
an unknown impedance terminating said first pair of side terminals for coacting with said attenuating means for reflecting energy emitted from said one side branch back into said one side branch,
a source of an A.C. signal,
means for coupling said A.C. signal source to one of said series and parallel branches,
and detecting means coupled to the other of said series and parallel branches for providing a signal into said network by said unknown impedance being coupled to said one side branch through said first-mentioned attenuating means.

2. High frequency reflected energy measuring apparatus in accordance with claim 1 and further comprising,
a second pair of side terminals,
and second attenuating means coupling the other of said side branches to said second pair of side terminals and including second resistive means much less than said effective reactance within said prescribed frequency range for terminating said other side branch so that termination of said second pair of side terminals with a second prescribed impedance coacts with said second attenuating means to terminate said other side branch in said common characteristic impedance.

3. High frequency reflected energy measuring apparatus in accordance with claim 2 and further comprising,
impedance means of said first prescribed impedance which is equal to said second prescribed impedance terminating said second pair of side terminals.

4. High frequency reflected energy measuring apparatus in accordance with claim 1 wherein said attenuating means is an L pad including said resistive means as the shunt arm and other resistive means as a series arm coupled between said at least one side branch and one of said first pair of side terminals.

5. High frequency reflected energy measuring apparatus in accordance with claim 4 wherein said at least one side branch has a reference terminal and a signal terminal.
said first pair of side terminals includes a reference terminal and a signal terminal,
said attenuating means is coaxial with an outer conductor intercoupling said reference terminals, first and second inner conductor sections intercoupled by said other resistive means along the axis of said attenuating means, and said shunt arm resistive means comprises an annular disc resistor intercoupling said outer conductor and said first inner conductor section,
said first inner conductor section being connected to said one side branch signal terminal, said second inner conductor section being connected to said side signal terminal.

6. High frequency reflected energy measuring apparatus in accordance with claim 5 wherein the other of said side branches has signal and reference terminals and further comprising,
a second pair of side terminals,
said second pair of side terminals including a reference terminal and a signal terminal,
a second of said attenuating means,
said second attenuating means first inner conductor section being connected to said other side branch signal terminal,
said second attenuating means second inner conductor section being connected to the signal terminal of said second pair of side terminals.

7. High frequency reflected energy measuring apparatus in accordance with claim 6 and further comprising,
impedance means of said first prescribed impedance which is equal to said second prescribed impedance terminating said second pair of side terminals.

References Cited by the Examiner

UNITED STATES PATENTS

| | | | |
|---|---|---|---|
| 2,620,396 | 12/1952 | Johnson et al. | 333—81 |
| 2,983,866 | 5/1961 | Alford et al. | 324—58 |
| 3,143,715 | 8/1964 | Martens et al. | 333—8 |

WALTER L. CARLSON, *Primary Examiner.*

G. L. LETT, E. E. KUBASIEWICZ, *Assistant Examiners.*